United States Patent [19]

Wataya et al.

[11] Patent Number: 5,740,424
[45] Date of Patent: Apr. 14, 1998

[54] INFORMATION PROCESSING SYSTEM AND METHOD USING TIME-VARYING DATABASE ALTERING INFORMATION

[75] Inventors: Hiroshi Wataya, Katsuta; Hiroaki Nakanishi; Keijiro Hayashi, both of Hitachi; Yoshiaki Adachi, Hitachioota; Hideki Tonooka, Hitachi; Kenji Matsuzaki, Hitachi; Tsutomu Onuki, Hitachi; Isao Terakado, Hitachi, all of Japan

[73] Assignees: Hitachi, Ltd., Tokyo; Hitachi Process Computer Engineering Inc., Hitachi, both of Japan

[21] Appl. No.: 691,472

[22] Filed: Aug. 2, 1996

Related U.S. Application Data

[63] Continuation of Ser. No. 99,305, Jul. 29, 1993, abandoned.

[30] Foreign Application Priority Data

Aug. 7, 1992 [JP] Japan .................................. 4-211227

[51] Int. Cl.⁶ ...................................................... G06F 17/30
[52] U.S. Cl. ............... 395/610; 395/200.48; 395/200.68; 395/617
[58] Field of Search ............................... 395/610, 200.01, 395/200.02, 200.03, 200.19, 680, 616, 617

[56] References Cited

U.S. PATENT DOCUMENTS

| 4,718,005 | 1/1988 | Feigenbaum et al. | 395/200 |
| 4,827,411 | 5/1989 | Arrowood et al. | 395/200 |
| 5,101,348 | 3/1992 | Arrowood et al. | 395/200 |
| 5,212,789 | 5/1993 | Rago | 395/600 |
| 5,345,558 | 9/1994 | Opher et al. | 395/200 |
| 5,408,610 | 4/1995 | Arakawa | 395/200 |

*Primary Examiner*—Paul V. Kulik
*Attorney, Agent, or Firm*—Kenyon & Kenyon

[57] ABSTRACT

There is disclosed an information processing system and method capable of coping with a wider range of subjects and intricate changes. In client server structure, time-varying database altering information received from external systems is pooled in servers and distributed to a number of distributed terminals or clients, using broadcasting communication.

22 Claims, 10 Drawing Sheets

| TRANSMISSION / RECEPTION | ON-LINE SYSTEM | TEST SYSTEM |
|---|---|---|
| ON-LINE SYSTEM | ○ | × |
| TEST SYSTEM | ○ | ○ |

○ POSSIBLE TO RECEIVE
× IMPOSSIBLE TO RECEIVE

FIG. 13(a)

DATA FORMAT OF DATABASE ALTERING INFORMATION

| EFFECTIVE DATA LENGTH | DATABASE KIND | DATA STORAGE ADDRESS | CHANGE DATE | CONTENTS OF DATA ALTERING |
|---|---|---|---|---|

MESSAGE KIND: DATABASE ALTERING INFORMATION

FIG. 13(b)

DATA FORMAT OF DATABASE INQUIRY MESSAGE

| EFFECTIVE DATA LENGTH | INQUIRY IDENTIFIER | DATABASE KIND | DATA STORAGE ADDRESS |
|---|---|---|---|

MESSAGE KIND: INQUIRE MESSAGE

FIG. 13(c)

DATABASE INQUIRY AND ANSWERING MESSAGE

| EFFECTIVE DATA LENGTH | INQUIRY IDENTIFIER | DATABASE KIND | DATA STORAGE ADDRESS | CHANGE DATE | CONTENTS OF DATA |
|---|---|---|---|---|---|

MESSAGE KIND: INQUIRY ANSWER 5,740,424

INFORMATION PROCESSING SYSTEM AND METHOD USING TIME-VARYING DATABASE ALTERING INFORMATION

This application is a continuation of application Ser. No. 08/099,305, filed on Jul. 29, 1993, now abandoned.

BACKGROUND OF THE INVENTION

1. Field of the Invention

The present invention relates generally to information processing systems and methods, and more particularly to an information processing system suitable for use as an on-line transaction system in which a computer is linked to external systems and a number of terminals, and to an information processing method therefor.

2. Description of the Prior Art

There have heretofore been utilized on-line transaction systems such as a bank account system or seat reservation system of airlines. In such a system database information is stored in one or more central systems, and altered and queried by lower-order terminals connected to the systems.

With respect to system in which a test system is installed in addition to an on-line system, Japanese Patent Laid-Open No. 166204/1990, for example, discloses a system which is used for operating and controlling a blast furnace.

However, the conventional arrangements as stated above are still unsatisfactory with respect to coping with a wider range of subjects and intricate changes. With the establishment of global markets of many different goods, there has developed a demand for new systems which allow end-users to gain from their terminals in real time information on current market prices and various current states in every corner of the world. Moreover, because of down-sizing, decentralized processing, development of communication technology, enhancement of functions of terminals such as workstations (hereinafter referred to as WSs), the systems are required to be decentralized. In addition, such systems are frequently subjected to remodeling and expansion to cope with the liberalization of markets and the shortening of product life cycles, which also makes it essential to set up test environments which are efficient and akin to the actual systems. Notwithstanding, no existing system meets the needs yet.

SUMMARY OF THE INVENTION

An object of the present invention is to provide an information processing system and method capable of coping with a wider range of subjects and intricate changes.

A feature of the present invention to accomplish the above object is that in client server structure, time-varying database altering information received from external systems is pooled in servers and distributed to a number of distributed terminals or clients, using broadcasting communication.

Another feature of the present invention is that a test environment of a new user-program (hereinafter referred to as a UP) partially prepared can be built up by system expansion/modification. In other words, test-system information pooling servers (hereinafter referred to as DBs), test-system information relay servers (hereinafter referred to as GWs) and a test-system-management server (hereinafter referred to as an MG) are set up over the same transmission network (e.g., Local-Area-Network, (LAN)) of an on-line system or on a transmission network different from that connected to an on-line system via a router. Information in the on-line system is taken by each server in the on-line system and by each server in the test system in parallel. Further, data transmitted over the transmission network in the on-line system is furnished with on-line system flags, and data transmitted from the test system servers is furnished with test system flags. In this case, the on-line system servers are allowed to receive only on-line system data, whereas the test system servers are allowed to receive both the on-line system data and test system data.

In a client server structure according to the present invention, broadcasting is used to pool time-varying database altering information received from external systems in the servers and to distribute the information to a number of distributed terminals or clients. Consequently, actual distribution of the servers on a transmission network can be determined for every system according to the processing performance, easily establishing distributed systems. Moreover, information can be obtained quickly at each terminal of a client since database altering information is available without the aid of the information pooling servers.

By the installation of test-system DBs, test-system GWs and a test-system MG over an on-line system transmission network or over a transmission network connected via a router to the transmission network of the on-line system, database altering information can be taken in parallel. As the on-line system is inhibited from receiving test system data, data erroneously transmitted from the test system is prevented from flowing into the on-line system.

BRIEF DESCRIPTION OF THE DRAWING

FIGS. 13(a), 13(b) and 13(c) are diagrams showing the formats of data of FIG. 2.

DETAILED DESCRIPTION

Referring to the accompanying drawings, an embodiment of the present invention will subsequently be described.

(1) Summary of system configuration.

Figure 1:
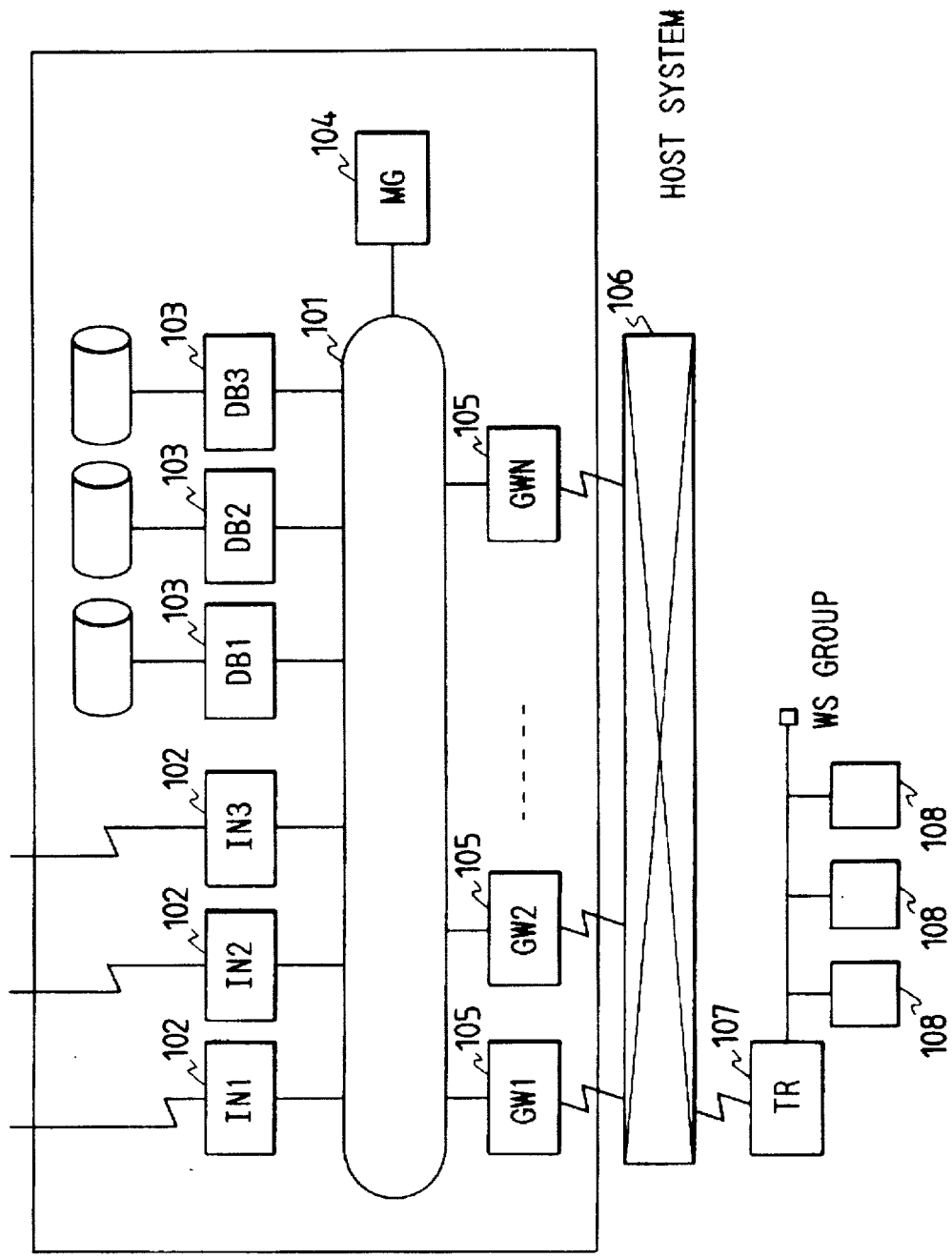
FIG. 1 is a view showing a schematic system configuration of an embodiment of the present invention.

FIG. 1 is a schematic system configuration embodying the present invention. This system has a client server structure as a network structure. A client server structure has servers for supplying network resources and clients who make use of the network resources over a network. More specifically, information input servers (hereinafter referred to as INs) 102 for receiving database altering information from external systems, DBs 103 for storing and managing the database altering information, GWs 105 connected to a plurality of terminal systems, and a MG 104 for managing/maintaining this system are installed over a transmission line 101 constituting a high-speed LAN. The GWs 105 are connected via a high-speed digital circuit 106 to a terminal server (hereinafter referred to as a TR) 107 in a host system made up of such a central system. One or more WSs 108 are connected to the TR 107.

The INs 102 fetch database altering information (information causing alterations in the contents of databases) such as market information in real time from external information processing systems existing in areas A, B and C scattering in a wide range and transmit database altering information by multicasting or broadcasting it over the transmission line 101 made up of a high-speed LAN. The INs 102 are installed in such a manner as to correspond to the external information processing systems scattered in the respective areas. This system of this embodiment includes three INs in the areas A, B and C.

The DBs 103 are servers for managing databases provided in correspondence with the external information processing systems installed in the respective areas A, B and C. The DBs 103 receives database altering information transmitted from the INs 102, alters the relevant data and replies to inquiries from the WSs 108 connected to the TRs 107. The DBs 103 may also be distributed like the INs 102 in the respective areas There are three DBs 103, respectively, in the areas A, B and C in the embodiment shown.

The GWs 105 are used for controlling many of the TRs 107 connected via the high-speed digital circuit 106 by means of a multiple circuit communication control unit (CCU). A plurality of TRs, for example 500 to 5,000 TRs, are installed for one GW 105. The GWs 105 transmit to all the TRs 107 linked to the GWs 105 by broadcasting only the information required by the TRs out of the database altering information received from the INs 102. The GW 105 function as a relay for receiving inquiry information from the WSs 108 connected to the TRs 107, transferring the inquiry information to the DBs 103, receiving replies from the DBs 103 and sending back the replies to the pertinent TRs 107.

The information processing system according to the present invention is a decentralized system and has a form of function sharing. In view of maintenance, however, the MG 104 is employed for performing concentrically running, maintenance information and operation. The acquisition of journals, the processing of alarm messages, remote maintenance system operations and the like are performed by the MG 104.

The TRs 107 perform relay operation of broadcasting broadcast data from the GWs 105 to the WSs 108 connected to the LAN, transmitting inquiries from the WSs to the GWs and transmitting the replies to the pertinent WSs 108.

The WSs 108, which is directly operated by end users, have the following functions.
The first function is manage data used with a frequency higher than a preset frequency using simple databases provided in the WSs 108. In other words, data used with a frequency higher than a preset frequency is stored in the WSs 108 and the DBs 103 redundantly. On receiving data from the TRs 107, to alter/update the relevant data in the simple databases.

The second function is reply what can be replied by the WSs 108 themselves, and to inquire of the DBs 103 what is impossible for the WSs 108 to make replies.

(2) Summary of data flow.

Figure 2:
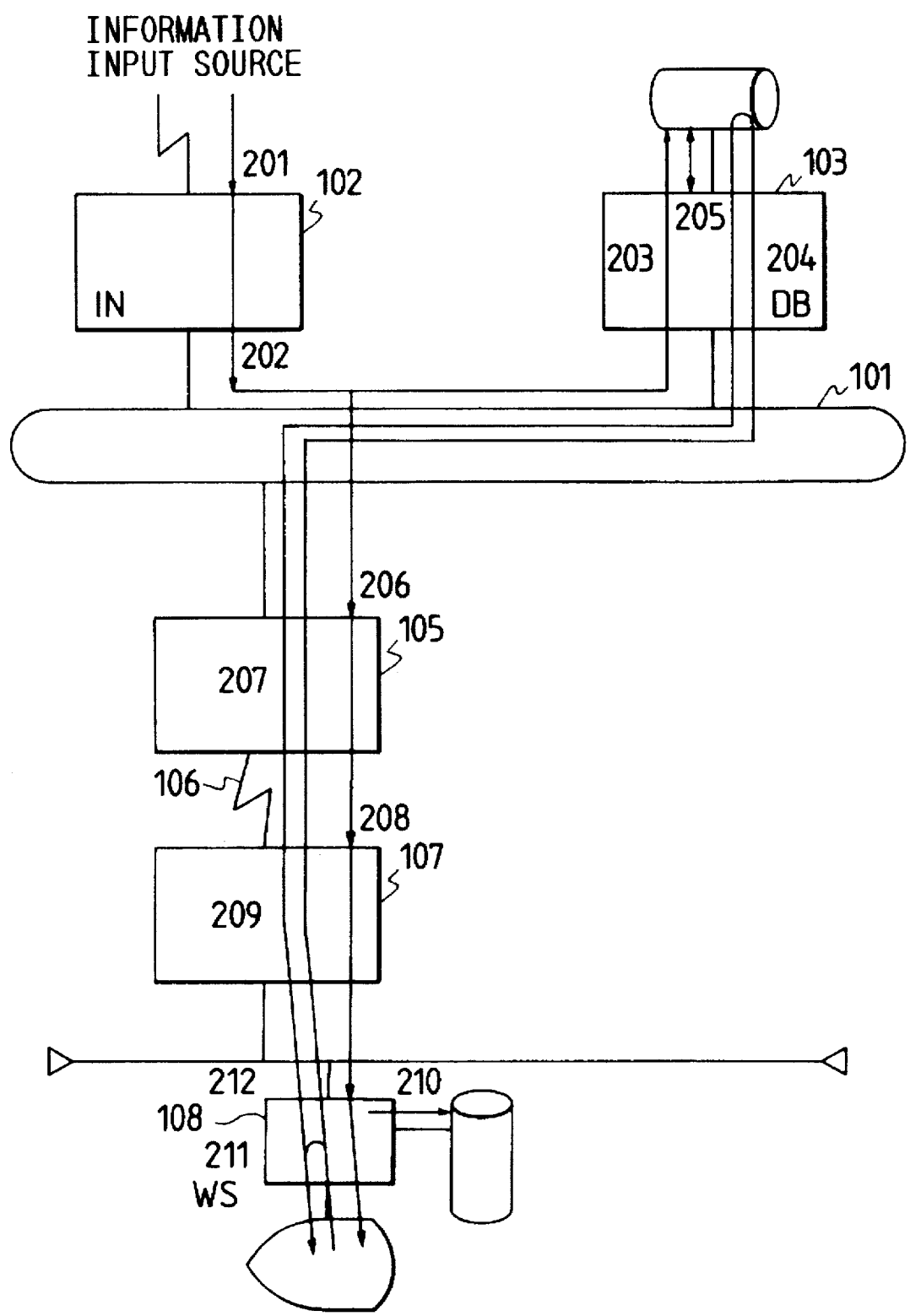
FIG. 2 is a diagram schematically showing a data flow relative to an information processing method used in the information processing system of FIG. 1.
Figure 11A:
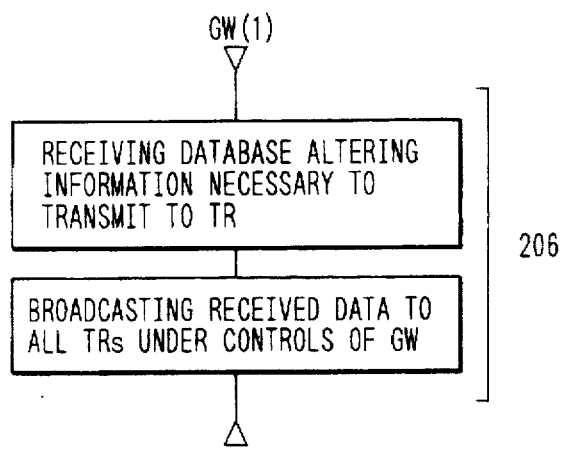
FIGS. 11(a), 11(b) and 11(c) are flowcharts showing the processing of FIG. 2.
Figure 11B:
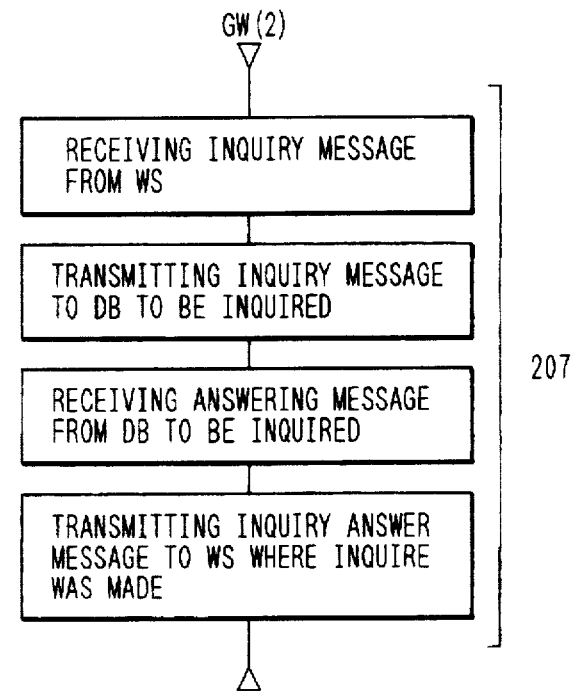
Figure 11C:
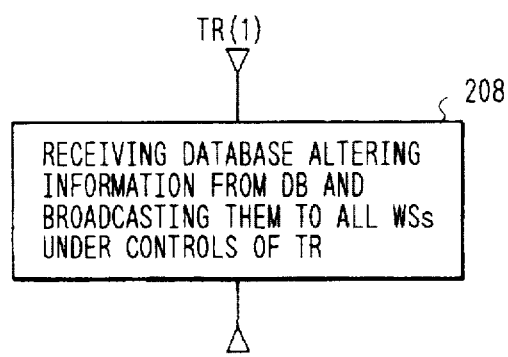
Figure 12A:
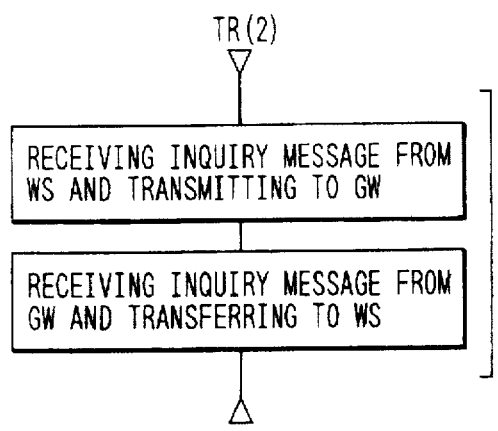
FIGS. 12(a), 12(b) and 12(c) are flowcharts showing the processing of FIG. 2.
Figure 12B:
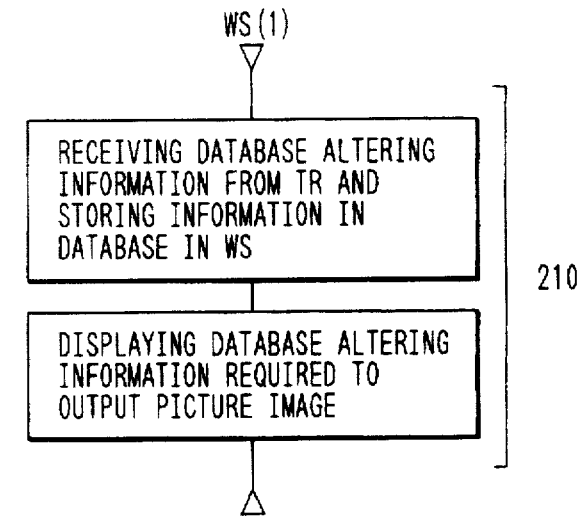
Figure 12C:
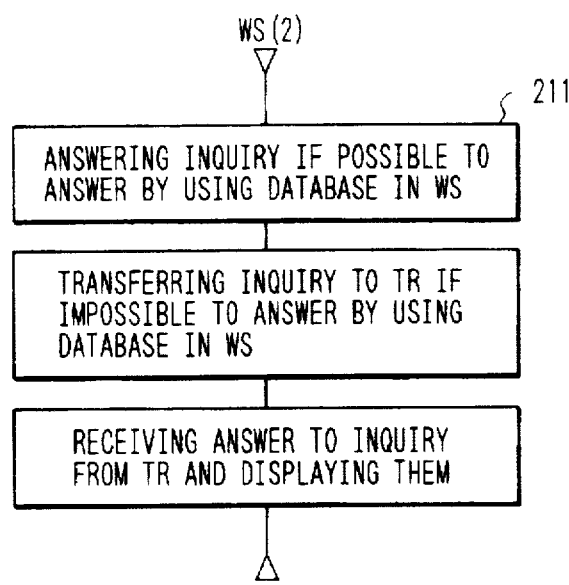

FIG. 2 schematically shows, as a data flow, an information processing method used in the information processing system of FIG. 1. FIGS. 10(a)–10(d) are flowcharts showing the steps 201 through 205 of FIG. 2. FIGS. 11(a)–11(c) are flowcharts showing the steps 206 to 207 of FIG. 2. FIGS. 12(a)–12(c) are flowcharts showing the steps 290 through 211 of FIG. 2. FIG. 13(a) slows a data format of database altering information. FIG. 13(b) shows a data format of a database inquiry message. FIG. 13(c) shows a data format of a message of replying to a database inquiry.

As shown in FIGS. 10 through 12, each IN 102 performs the step 201 of receiving database altering information from an external information processing system and the step 202 of distributing the database altering information to the transmission line 101. Each DB 103 performs the step 203 of receiving database altering information and storing the database altering information in a storage medium in the DB 103, the step 204 of answering/editing an inquiry from the WS 108, and a step 205 of computing/updating database therein. Each GW 105 performs the step 206 of broadcasting database altering information to TRs 107 and the step 207 of relaying an inquiry from a TR 107. Each TR 107 performs the step 208 of broadcasting database altering information to the WSs 108 and the step 209 of relaying an inquiry to a DB 103. Each WS 108 performs the step 210 of receiving/ storing database altering information, the step 211 of replying to an inquiry in return, the step 212 of replying to an inquiry from a DB, and the step 213 of computing database information.

As shown in FIG. 13(a), the data format of database altering information comprises effective data length, message kind (i.e., database altering information), a data storage address, a change date and the contents of data alteration. As shown in FIG. 13(b), the data format of a database inquiry message comprises effective data length, message kind (i.e., an inquiry message), an inquiry identifier, database kind and a data storage address. As shown in FIG. 13(c), the data format of a database inquiry and answering message comprises effective data length, message kind (i.e., inquiry answer), an inquiry identifier, database kind, a data storage address, a change date and the contents of data.

(3) Summary of functions of each server.
(3.1) Functions of IN 102.

The information sources of the INs 102 of this system are external system existing in remote areas like areas A, B and C. The information sources furnish servers in respective host systems with information having a standard format within the system. Further, the INs 102 are allowed to inquire of external systems about inquiries from the servers within each host system. For this function, the following points should be taken into consideration:

1) efficient data transmission to each server;
2) quick response to an inquiry from each server;
3) reduction in the number of inquiries to other systems; and
4) flexible system configuration in order to cope with an increase in the amount of data.

Consequently, each IN 102 has the functions of compressing data, storing (pooling) inquiry data, relaying information from external systems, and dealing with inquiries from the servers. A description will subsequently be given of each individual processing function.

(1) The step of relaying information from external systems comprises of, on receiving database altering information from any external system, data is compressed into the standardized format in the system involved, the compressed data is transmitted by broadcasting to the transmission line network 101 and the data to be pooled is stored in the database of the INs 102.

(2) The server inquiry/answering/pooling data editing step comprises of each IN 102 judging the inquiry from a server in the system to be addressed to an external system or to be returned to the IN 102 on receiving the inquiry, and sending back pooled information as a reply with respect to data to be pooled without inquiring of external systems.

(3) The step of dealing with day-to-day data comprises of inputting next-day on-line file information for the following day into a file and developing an on-line service table. After the table is developed, day-to-day data is transmitted to each server.

(4) Each IN 102 inputs the basic information/tables received from external systems into a file to prepare the aforesaid day-to-day data file. This function is used for recovery of the IN 102. In other words, even if one of the INs 102 malfunctions and damages on-line service tables, the IN 102 recovers from failure by means of the recovery file.

(5) The system management function is that a table is developed from files at the time when the host system is started and various initializations are performed to establish a state in which service is available, and that hardware and softwares are monitored so as to eliminate various kinds of troubles when they are detected.

(6) With respect to data retransmission, each IN 102 pools database altering information in the event that the TRs 107 fail to take in the information and retransmits it when the frequency with which the altering information is transmitted from the external systems is low.

(7) The distribution step comprises of editing database altering information from external systems and data to be transmitted as a reply to the inquiry from other servers into information of a standardized format within the host system, converting by data-compression, and transmitting to the host system.

(3.2) Function of DB 103.

Figure 3:
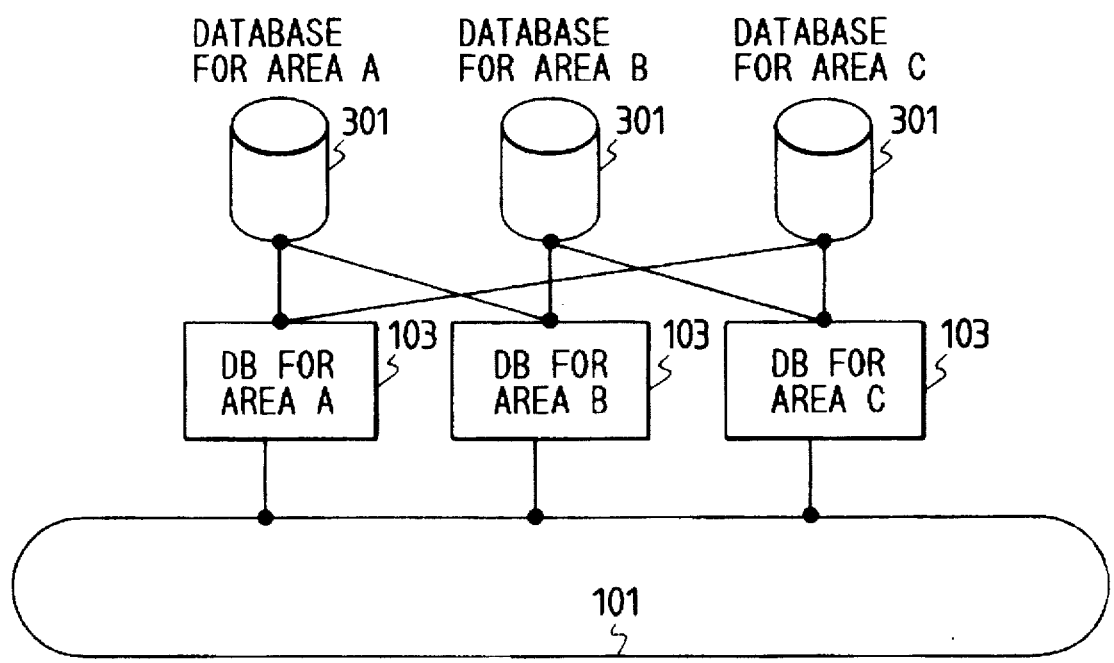
FIG. 3 is a diagram showing an arrangement of DB databases for an embodiment of the present invention.

FIG. 3 shows a configuration of DB databases. The DBs 103 process and store a large amount of data in, for example, the areas A, B and C. Three decentralized DBs 103 are installed for respective areas A, B and C, whereby it is possible to readily cope with an increase in the number of markets and brands in the future by increasing the number of DBs 103 and the like. Moreover, databases 301 for areas A, B and C are linked to additional DB 103 other than the DBs 103 for performing the processes. Further, each of the DBs 103 incorporates the functions of dealing with the three areas inclusive and determines a process to be performed, depending on the database in the area it supports. In other words, the DBs 103 support mutual processes to be performed by adjoining computers by inputting area information transmitted by broadcasting to the transmission network 101 by an autonomous decentralizing system and by switching the connections of databases. Incidentally, the mutual support can be made between adjoining DBs 103. In this case, it is only necessary for the DBs 103 to incorporate the process to be performed by adjoining the DB 103.

For example, a disk for use in the database 301 for the area A is alternatively connected to the DB 103 for the area B when the operation of the DB 103 for the area A has to be stopped for testing purposes, for the maintenance of the hardware or the like, so that a process to be performed by the DB 103 for the area A is fulfilled by the DB 103 for the area B. With this arrangement, the operation of the DB 103 for the area A can be suspended without lowering the total system performance.

DB 103 has a function of performing database altering information reception process, database altering process, data input process, application data creating process, information computing process, host inquiry retrieval process, database backup process. A detailed description will be given of each process below.

(1) The database altering information reception process includes i) monitoring the circuits for connection to the INs 102, ii) receiving messages from the INs 102, and iii) issuing a request for retransmitting the messages which is missing out of the messages from the INs 102 occurs.

(2) The database altering process includes altering the date to be held in each DB 103 on the basis of the database altering information received from the INs 102.

(3) The data input process includes pooling the information fed from the MG.

(4) The application data creating process includes taking the statistics of various kinds of information for inquiries from the WSs 108 connected to the TR 107 and pooling the results in files.

(5) The information computing process includes periodically computing exponential information inherent to the system from the information held in each DB 103 and pooling the results.

(6) The host inquiry retrieval process includes retrieving the database held the by DBs 103 and answering the inquiry, if any, from the WSs 108 about it.

(7) The database backup process includes periodically backing up the database held by each DB 103 under instructions from the MG.

(3.3) Function of GW 105.

Each GW 105 has the function of performing the following processes:

(1) The database altering information distributing process includes broadcasting the database altering information received from an IN 102 over all TRS 107 linked to the GWs 105 and storing the altering information in the GWs 105.

(2) The process of effecting connection with TR 107 includes monitoring the circuits and retransmission for a retransmitting inquiry from a TR 107 in addition to transmitting/receiving data normally during the transmitting/receiving operation with respect to TR 107.

(3) The TR inquiry analysis/response process includes preparing and transmitting an inquiry message addressed to each server in response to an inquiry from a TR 107 to the IN 102 or DB 103 and sending a response to the TR 107 on receiving an inquiry message from each server.

(5) The process of receiving TR information includes receiving system altering information such as on the alteration of a TR 107 from the MG and reflecting the information in the control table.

(3.4) Function of MG 104.

This system is a distributed one with its function distributed. In view of maintainability, however, the system needs centralizing as far as application, maintaining information and operation are concerned. Therefore, the MG 104 has the following functions or performs the following processes:

(1) The centralized console function includes making the MG 104 collect all of the messages including the ones about troubles having brought about in each server in the system and in the communication system, and alarm messages, and output them to the centralized console.

(2) The system support process includes i) effecting an initial process of each server and starting each of operating programs, ii) holding inquiry destination management information, that is, holding information on which server is inquired of when an inquiry is received from a TR 107, iii) maintaining TR arrangement/management information, iv) maintaining server management information, and v) distributing the management information described in the above items i)–iv) to each server.

(3) The process of backing up data in the DBs 103 and MGs 104 includes periodically backing up data in the DBs 103 and the MG 104.

(4) The process of making the MG 104 control all server operating program sources concentrically.

As shown in FIG. 3, it is possible for the DBs to back up one another by connecting crosswise the databases and the DBs.

Moreover, using a plurality of databases and DBs in combination and using the difference in operating time in the areas, the non-stop operation of the whole host system can be made possible without the continuous operation of the databases and DBs in combination. In addition, the whole host system can be maintained without the interruption of its operation by utilizing downtime of each combination of the database and DB.

As set forth above, non-stop operation/maintenance can readily be accomplished by installing a combination of the databases and DBs at places where differences in operating time exist (e.g., time difference between Japan and the United States B).

(4) Test system and method.

A description will subsequently be given of a test system and method.

Figure 4:
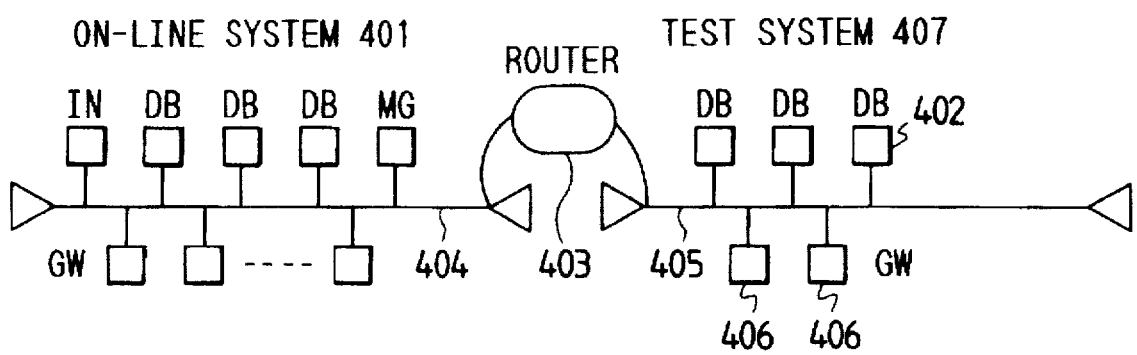
FIG. 4 is a diagram showing a testing arrangement for an embodiment of the present invention.
Figure 5:
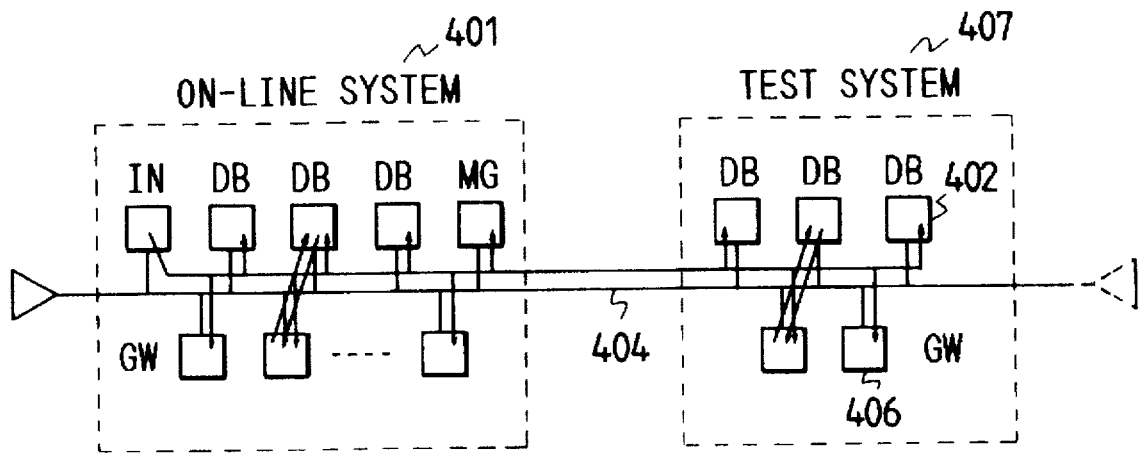
FIG. 5 is a diagram showing monitor run of an embodiment of the present invention.

FIG. 4 illustrates a test arrangement in this system. DBs 402 and GWs 406 for testing are connected to a transmission line 405 of a LAN 407 of a test system connected via a router 403 to a transmission line 404 of a LAN 401 of an on-line system. As shown in FIG. 5, it is also considered feasible to install the LAN 401 of the on-line system and the LAN 407 of the test system on the same LAN. Two testing forms of monitor run and on-line backup in such a system will subsequently be described.

(4.1) Monitor run function.

The monitor run function is to take on-line system data in parallel, to transmit/receive data in the test system loaded with a new user program (hereinafter referred to as new UP) partially prepared by system expansion/alteration, and to carry out the new UP monitor run.

More specifically, the DBs and the GWs in the test system receive data on database altering information transmitted by broadcasting from the IN in the on-line system as shown in FIG. 5. The DBs in the test system alter the databases connected thereto according to the database altering information. The GWs in the test system transmit the received database altering information by broadcasting to the TRs in the test system connected to the GWs in the test system. Further, the GWs in the test system transfer an inquiry from a TR in the test system to the DBs in the test system to deal with the inquiry. The new UP monitor run can thus be carried out by using actual on-line data.

All the servers in this system operate in the on-line or test system. The most serious problem arising in this testing form is that data in the test system is erroneously introduced into the on-line system. As a result, the following measures are taken in this system.

Figure 6:
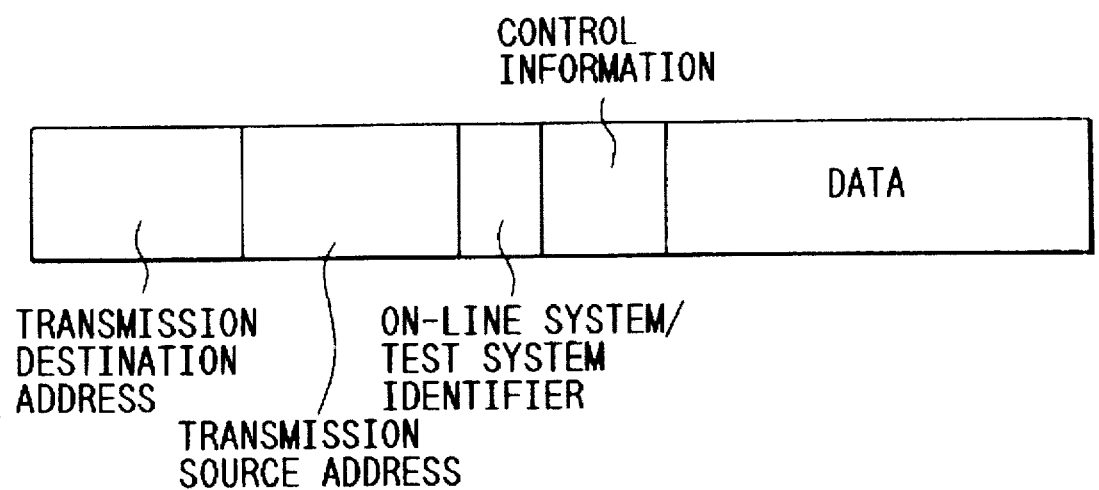
FIG. 6 is a schematic diagram showing a message format the embodiment of the present invention.

As shown by a message format of FIG. 6, an on-line system/test system identifier 601 as information for distinguishing between messages transmitted from the on-line and test systems is included in the message transmitted from each server. According to this message format a transmission destination address, a transmission source address, the on-line system/test system identifier (flag) 601, control information and data are transmitted in this order.

Figure 7:
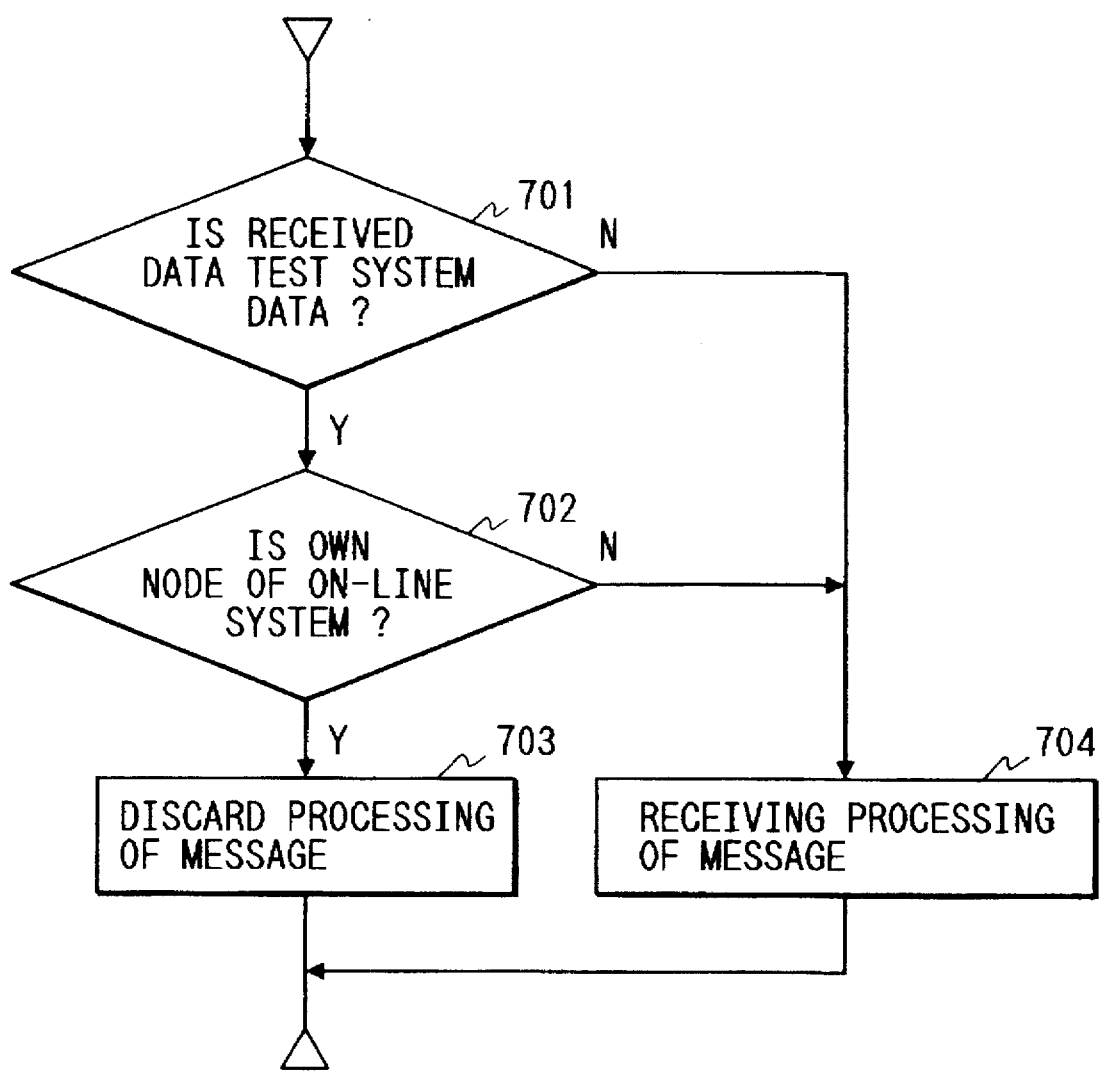
FIG. 7 is a reception flowchart of an embodiment of the present invention.

FIG. 7 shows a reception flowchart. As shown in FIG. 7, an on-line system/test system mode check is made on all of data received on the message reception side. Any test system message is discarded in the on-line system. Conversely, on-line system data can be received in the test system. Steps of the process is as follows: First, a decision is made on whether received data is test system data (Step 701). If test system data is received, a decision is made on whether the own node is of the on-line system (Step 702). If the own node is of the on-line system, the message is discarded (Step 703). When the data is not of the test system nor of the on-line system node, the process of receiving the message is performed (Step 704).

Figures 8, 9:
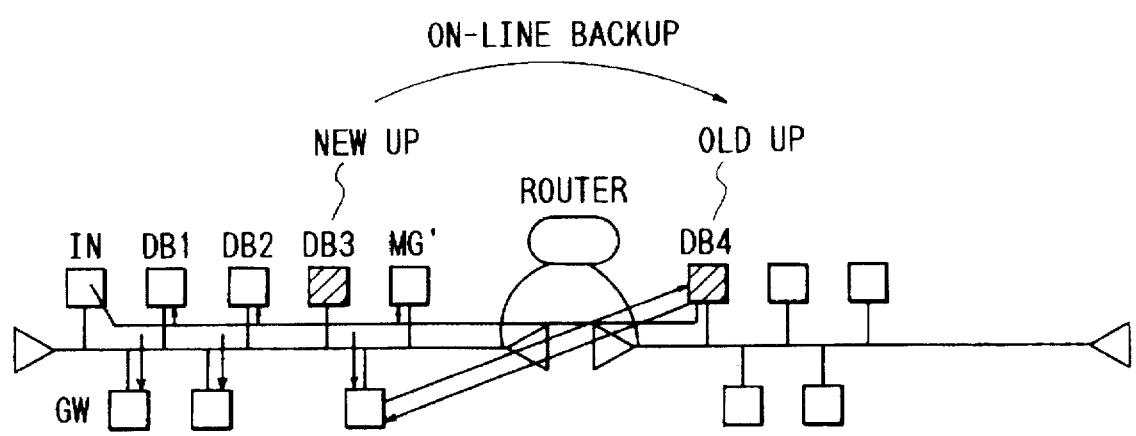
FIG. 8 is a table showing the processing of deciding whether or not an on-line system/test system can be received in an embodiment of the present invention.
FIG. 9 is a diagram showing an on-line backup function of an embodiment of the present invention.
Figure 10A:
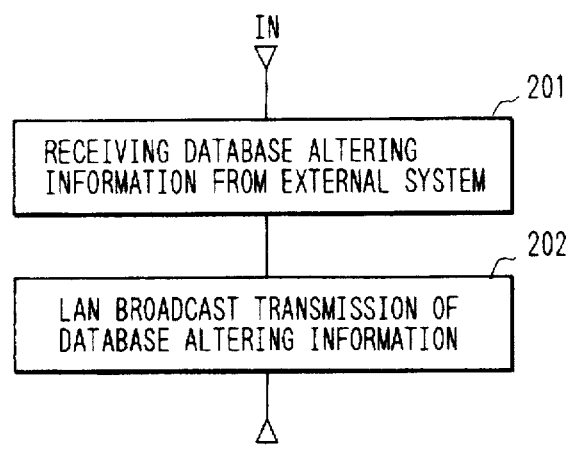
FIGS. 10(a), 10(b), 10(c) and 10(d) are flowcharts showing the processing of FIG. 2.
Figure 10B:
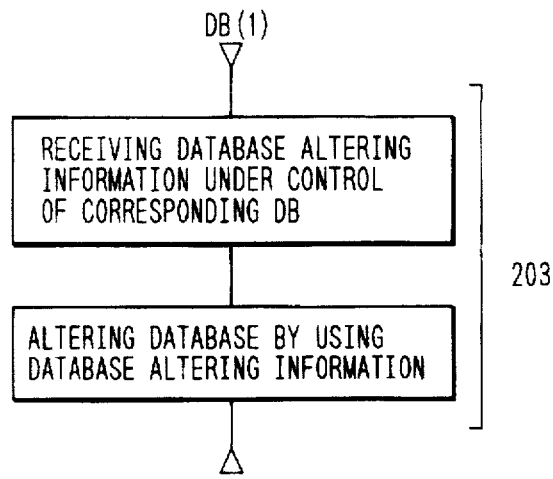
Figure 10C:
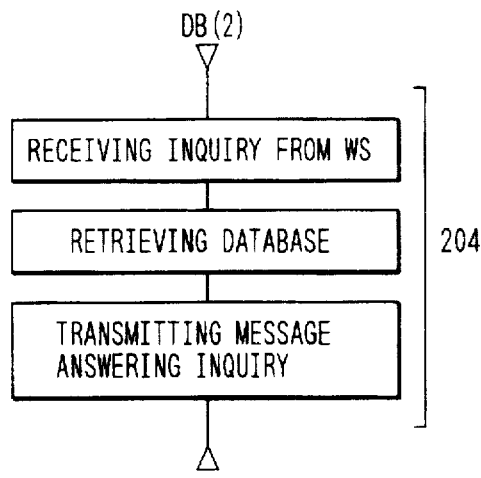
Figure 10D:
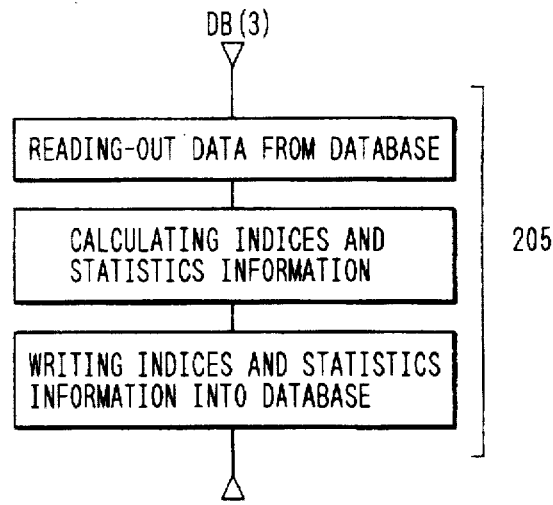

FIG. 8 shows decision making criteria in reference to FIG. 7. When the transmission source is of the test system and the transmission destination is of the one-line system the data is discarded and this makes data reception impossible. As the arrangement like this has thus been contrived, the on-line system is prevented from being badly affected by bugs in the new UP at the time of monitor run. In other words, a lock mechanism by means of the identifier for distinguishing between the on-line and off-line systems is achieved.

In order to prevent data exerting a bad influence from flowing from the test system to the on-line system, the router 403 may be provided additionally with a filtering function for filtering use on the basis of the on-line system/test system identifier 601.

(4.2) On-line backup function.

When the quality of a new UP is upgraded to a certain degree after the monitor run of the new UP is carried out for a predetermined time period by the computer of the test system, the new UP is installed in the computer of the on-line system. When the new UP is executed in the on-line system, in case a system down ascribed to the new UP occurs, the system needs reoperating by quickly restoring using the former UP. For this reason, the computer of the test system, which is usually used as a test machine, is preliminarily loaded with the former UP. When the on-line machine malfunctions, it is instantly switched over to the machine with the old UP by altering only the component information. This function is called an on-line backup function.

FIG. 9 illustrates specific steps taken to perform the on-line backup function according to the present invention.

Step (1): a new UP is installed in a DB 3 of the on-line system so as to start on-line processing.

Step (2): the former UP of the DB 3 is then installed in a DB 4 of the test system used as a backup machine.

Step (3): when a system down occurs because of a failure associated with the new UP in the DB 3 during the on-line processing, the backup machine DB 4 is instantly started as an on-line machine and takes over the process from the DB 3. At this time, the component control information is altered so that the remaining computers (IN, DB 1, DB 2, GW, etc.) of the on-line system transmit to the DB 4 the data that has been transmitted to the DB 3.

As set forth above, an information processing system and method embodying the present invention is provided as a means capable of set up a system and its test environment for pooling momentarily-changing database altering information received from external systems and for distributing the database altering information to a number of terminals distributed in a wide area.

More specifically, (1) Any alteration in a database is instantly reported to the terminal side by pooling database altering information from external systems and simultaneously by distributing (transmitting) the information to a plurality of terminals.

(2) The system can readily be decentralized by letting the system have a client/server structure which is accomplished with a group of computers connected using LAN.

(3) System expansion/flexibility is available by connecting TRs and a plurality of WSs using a LAN so as to build up a terminal system.

(4) High system-reliability is obtainable by making INs broadcast database altering information over a LAN of a central system and making each server selectively receive the information so as to localize any trouble in each server.

(5) The time required to response an inquiry to a WS can be reduced by making the WSs redundantly hold database information whose access frequency is higher than a predetermined one. Moreover, the frequency and time of use of circuits is easily curtailed since the data can be collectively transmitted from the GWs.

(6) Distribution of loads and maintenance are facilitated by providing DB, IN in each external system when time differences exist among the external systems.

(7) DBs provided in each external system can continue their processing because of the backup of the databases by other DBs even when the operation of a certain DB needs stopping because of trouble/maintenance.

(8) Cooperation between servers in processing data makes it possible to distribute database altering information to the WSs in real time and to respond to an inquiry from a WS.

(9) Database altering information from INs in the on-line system can be taken in parallel by building up a test system on a LAN identical with the on-line system or connected via a router to a LAN, so that almost actual test environment can be realized.

(10) Wrong data in the test system can be prevented from entering the on-line system by giving all the pieces of data flowing on a LAN on-line/test identifiers to inhibit the on-line system to receive test system data. Thus any situation which may cause a system failure is avoided.

(11) On-line backup operation is possible by switching the test system/on-line system in each server.

The present invention has the effects enumerated above.

Although the areas A, B and C have been taken as distributed areas in the embodiment, the present invention is not limited to those but may be applicable to a plurality of information sources different in area or kind.

In other words, any modification is feasible within the spirit and scope of the present invention.

According to the present invention, it is possible to provide an information processing system and method capable of coping with more versatile subjects and intricate changes.

What is claimed is:

1. An information processing method, comprising the steps of:
    (a) broadcasting a database altering information received from an external system over a first transmission network;
    (b) altering a database managed by an information pooling server on the basis of said database altering information;
    (c) transmitting said database altering information received from said first transmission network to a plurality of terminal servers by broadcasting; and
    (d) transmitting said database altering information from each of said terminal servers to a plurality of terminals by broadcasting.

2. The information processing method of claim 1, further comprising the following steps:

(e) said information pooling a response/edit processing for an inquiry request from a terminal;
    (f) relaying an inquiry request from a terminal connected to one of the terminal servers and transferring, to a communication server which has addressed an inquiry, the inquiry addressed to the information pooling server and the response of the information pooling server to the inquiry; and
    (g) receiving at a terminal the database altering information, altering a database managed thereby, and when the database managed thereby is insufficient for an inquiry request from an end-user, transferring the inquiry request to the information storage server.

3. The information processing method of claim 1, wherein a group of machines of a test system are arranged over the first transmission network.

4. The information processing method of claim 3, wherein the group of test machines are connected via a router to the first transmission network.

5. The information processing method of claim 4, wherein data transmitted from the group of machines of the test system and caused to flow through the first transmission network are given an identified for identifying test system data.

6. The information processing method of claim 5, wherein test system data are discarded by the group of machines of the on-line system, whereas the test system data and the on-line system data are received by the group of machines of the test system.

7. An information processing method as claimed in claim 5, wherein database altering information from the information input server of the on-line system parallely taken by the information pooling servers and information relay servers of the on-line system and the information pooling servers and information relay servers of the test system.

8. An information processing method as claimed in claim 5, wherein when at least one of the servers of the group of machines of the on-line system malfunctions, at least one of the servers in the group of machines of the test system is used as a substitute.

9. An information processing method comprising the following steps:
    (a) compressing data into a standard format when database altering information is received from an external system, broadcasting the compressed data over a first transmission network and storing data to be stored (hereinafter referred to as pooling) in a database of an information input server; and
    (b) said information input server responding to an inquiry from each server connected to said first transmission network with respect to the information to be pooled on the basis of information stored in step (a).

10. The information processing method of claim 9, further comprising the steps of pooling database altering information in the information input server and retransmitting the database altering information when the frequency of transmission of altering information from the external systems is low.

11. The information processing method of claim 9 further comprising the following steps:
    (c) monitoring the circuit connected to the information input server, receiving a message including the database altering information from the information input server, and issuing a request for retransmitting the message in case the message therefrom is left out;
    (d) altering the database held in each information pooling server on the basis of the database altering information received from the information input server;

(e) pooling the information inputted from a system management server; and (f) computing exponential information inherent in the system according to the information held in each of the information pooling servers and pooling the results.

12. The information processing method of claim 9 further comprising the steps of transmitting the database altering information received from the information input server to all of a plurality of terminal servers linked to the information relay server by broadcasting and distributing the database altering information pooled in a information relay server.

13. The information processing method of claim 9 further comprising the steps of collecting all the messages of troubles having arisen in each server in the system and in the communication system, and any other alarm messages, and outputting them to a centralized console.

14. An information processing system comprising:

a first transmission network;

a first server, said first server broadcasts database altering information from a plurality of outside systems over said first transmission network;

a second transmission network;

a second server coupled to both said first transmission network and said second transmission network;

a third transmission network; and a third server said third server being connected to both said second transmission network and said third transmission network;

whereby said second server relays the database altering information broadcasted from the first server to the second transmission network and whereby said third server relays said data base altering information to said third transmission network.

15. The information processing system of claim 14, further comprising a fourth server, said fourth server pools the database altering information broadcasted from said first server, said fourth server being connected to said first transmission network.

16. The information processing system of claim 15, wherein:

said first server is an information input server, said second server is an information relay server, said third server is a terminal server, and said fourth server is an information pooling server.

17. The information processing system of claim 16, further comprising:

a system management server for managing the transmission state of the first transmission network, the system management server being connected to the first transmission network.

18. The information processing system of claim 16, further comprising:

a terminal for displaying information pooling information including the information pooling altering information, the terminal being connected to the third transmission network.

19. The information processing system of claim 16, wherein said information pooling server and said information relay server simultaneously receive the information pooling altering information transmitted by broadcasting from said information input server.

20. An information processing system as claimed in claim 18, wherein information displayed on the terminal with a frequency higher than a preset one is held in the terminal.

21. An information processing system as claimed in claim 15, wherein when a plurality of external systems are provided, an information input server and an information pooling server are installed for every external system.

22. An information processing system as claimed in claim 21, wherein at least a first and a second external system constitute the external system, a first information pooling server corresponding to the first external system has a storage medium for storing database information from the first external system, connected to a second information storage server corresponding to the second external system as a backup, and provided with a program for processing database in the second information pooling server.

* * * * *